(12) United States Patent
Pelusi

(10) Patent No.: US 8,396,367 B2
(45) Date of Patent: Mar. 12, 2013

(54) HIGH FREQUENCY OPTICAL PROCESSING

(75) Inventor: Mark Pelusi, Camperdown (AU)

(73) Assignee: The University of Sydney, Sydney, NSW (AU)

( * ) Notice: Subject to any disclaimer, the term of this patent is extended or adjusted under 35 U.S.C. 154(b) by 286 days.

(21) Appl. No.: 12/664,361

(22) PCT Filed: Jun. 12, 2008

(86) PCT No.: PCT/AU2008/000841
§ 371 (c)(1),
(2), (4) Date: May 24, 2010

(87) PCT Pub. No.: WO2008/151370
PCT Pub. Date: Dec. 18, 2008

(65) Prior Publication Data
US 2010/0247101 A1    Sep. 30, 2010

(30) Foreign Application Priority Data

Jun. 14, 2007    (AU) ............................... 2007903207

(51) Int. Cl.
*H04J 14/08*    (2006.01)
(52) U.S. Cl. .......................................... 398/98; 398/101
(58) Field of Classification Search .................... 398/82, 398/83, 101, 179, 146
See application file for complete search history.

(56) References Cited

U.S. PATENT DOCUMENTS

| | | | |
|---|---|---|---|
| 5,825,519 A | 10/1998 | Prucnal | |
| 5,963,567 A * | 10/1999 | Veselka et al. | 372/21 |
| 5,999,292 A | 12/1999 | Dennis et al. | |
| 6,262,834 B1 * | 7/2001 | Nichols et al. | 359/301 |
| 6,591,026 B2 * | 7/2003 | Endo et al. | 385/15 |
| 6,766,070 B2 * | 7/2004 | Williams et al. | 385/3 |
| 2002/0044727 A1 | 4/2002 | Hung | |

OTHER PUBLICATIONS

R. S. Tucker, G. Eisenstein, and S. K. Korotky, "Optical time division multiplexing for very high bit-rate transmission," *IEEE Photon. Technol. Lett.*, vol. 6, pp. 1734-1749, 1988.

A. H. Gnauck, G. Raybon, Member, IEEE, P. G. Bernasconi, J. Leuthold, Member, C. R. Doerr, and L. W. Stulzl "*l-Tb/s* (6 170.6 Gb/s) Transmission Over 2000-km NZDF Using OTDM and RZ-DPSK Format", *IEEE Photon. Technol. Lett.*, vol. 15, No. 11, pp. 1618-1620, 2003.

H. Murai, M. Kagawa, H. Tsuji, and K. Fuji, "EA Modulator-Based Optical Multiplexing/Demultiplexing Techniques for 160 Gbit/s OTDM Signal Transmission", *IEICE Trans. Electron.*, vol. E88-C, No. 3, pp. 309-318, 2005.

H.-F. Chou, J. E. Bowers, and D. J. Blumenthal, "Compact 160-Gb/s AddDrop Multiplexer With a 40-Gb/s Base Rate Using Electroabsorption Modulators", *IEEE Photon. Technol. Lett.*, vol. 16, No. 6, pp. 1564-1566, 2004.

C. Schubert, J. Berger, S. Diez, H.J. Ehrke, R. Ludwig, U. Feiste, C. Schmidt, H.G. Weber, G. Toptchiyski, S Randel, and K. Petermann, "Comparison of Interferometric All-Optical Switches for Demultiplexing Applications in High-Speed OTDM Systems", *IEEE J. Lightwave Teclmol.*, vol. 20, No. 4, pp. 618-624, 2002.

(Continued)

*Primary Examiner* — Dalzid Singh

(57) ABSTRACT

This invention concerns a high frequency optical processor suitable for time-division demultiplexing and channel dropping data signals at bit rates of 80-160 Gb/s and beyond, and for carving high frequency pulse streams with low duty cycle from an unmodulated laser source. In further aspects the invention concerns methods for using the high frequency optical processor. In particular the invention comprises a high frequency optical processor, comprising a Mach-Zehnder amplitude modulator (MZM) embedded in a fiber mirror loop in which the loop input and output are joined by a polarization maintaining coupler.

11 Claims, 4 Drawing Sheets

OTHER PUBLICATIONS

R. Salem, A. S. Lenihan, G. M. Carter, and T. E. Murphy, "160-Gb/s Polarization-Independent Optical Demultiplexing in 2-m Nonlinear Fiber", *IEEE Photon. Techno!. Lett.*, vo. 18, No. 21, pp. 2245-2247, 2006.

H. Sotobayashi, C. Sawaguchi, Y. Koyamada, and W. Chujo, "Ultrafast walkoff-free nonlinear optical loop mirror by a simplified configuration for 320-Gbit/s time-division multiplexing signal demultiplexing ," *Opt. Lett.* vol. 27, pp. 1555-1557, 2002.

K. Igarashi, K. Katoh, and K. Kikuchi, "Optoelectronic time-division demultiplexing of 160-Gbit/s optical signal based on phase modulation and spectral filtering", *Optics Exp.*, vol. 15, No. 3, pp. 845-851, 2006.

M. L. Dennis, W. l. Kaechele, W. K. Burns, T. F. Carruthers, and l. N. Duling, III, "Photonic Serial-Parallel Conversion of High-Speed OTDM data", *IEEE Photon. Technol. Lett.*, vol. 12, No. 11, pp. 1561-1563, 2000.

M. Jinno, "Ultrafast Time-Division Demultiplexer Based on Electrooptic On/OffGates", *IEEE J Lightwave Technol.*, vol. 10, No. 10, pp. 1458-1465, 1992.

E.J.M. Verdurmen, Y. Zhao, E. Tangdiongga, J.P. Turkiewicz, G.D. Khoe, and H. de Waardt, "Error-free all-optical add-drop multiplexing using HNLF in a NOLM at 160 Gbit/s", Electron. Lett. 41, 349-350 (2005).

G. K. Gopalaknshnan, W. K. Burns, R. W. McElhanon, C. H. Bulmer, and A. S. Greenblatt, "Performance and Modeling of Broadband LiNb03 Traveling Wave Optical Intensity Modulators", J. Lightwave Technol. 12, 1807-1819 (1994).

PCT International Search Report and Written Opinion of the Searching Authority, International Application No. PCT/AU2008/000841, Australian Patent Office, Aug. 14, 2008, 7 pages.

Minyu Yao et al., "All-Optical Demultiplexing of 8×2.5Gb/s Pseudo-random OTDM Data Stream Using Nonlinear Optical Loop Mirror", Fiber Optic Components & Optical Communication II, Sep. 18-19, 1998, Beijing, China, SPIE vol. 3552, 1998, pp. 216-220.

Mark D. Pelusi, "Fiber-Looped $LiNbO_3$ Mach-Zehnder Modulator for 160 Gb/s Optical Time Division Demultiplexing and it's Comparison to an Electro-Absorption Modulator" OFC/NFOEC 2008, 3 pages.

Tetsuro Komukai et al., "Optical Pulse Generator Using Phase Modulator and Linearly Chirped Fiber Bragg Gratings", IEEE Photonics Technology Letters, vol. 17, No. 8, Aug. 2005, pp. 1746-1748.

Mark Pelusi, "Optical time-division channel drop and demultiplexing at 4:1 bit rate using a single Mach-Zehnder modulator in a fiber loop", COIN-ACOFT 2007, Jun. 24-27, 2007 Melbourne, Australia, 3 pages.

J.J. Veselka et al., "Pulse Generation for Soliton Systems Using Lithium Niobate Modulators", IEEE Journal of Selected Topics in Quantum Electronics, vol. 2, No. 2, Jun. 1996, pp. 300-310.

Mark D. Pelusi, "160-Gb/s Optical Time-Division Demultiplexing Using a Mach-Zehnder Modulator in a Fiber Loop", IEEE Photonics Technology Letters, 2008, 3 pages.

Ed L. Wooten et al., "A Review of Lithium Niobate Modulators for Fiber-Optic Communications System", IEEE Journal of Selected Topics, in Quantum Electronics, vol. 6, No. 1, Jan./Feb. 2000, pp. 69-82.

\* cited by examiner

HIGH FREQUENCY OPTICAL PROCESSING

TECHNICAL FIELD

This invention concerns a high frequency optical processor suitable for time-division demultiplexing and channel dropping data signals at bit rates of 80-160 Gb/s and beyond, and for carving high frequency pulse streams with low duty cycle from an unmodulated laser source. In further aspects the invention concerns methods for using the high frequency optical processor.

BACKGROUND ART

Direct data modulation and detection of optical data signals at bit rates of 80-160 Gb/s and beyond is constrained by the modulation bandwidth of electro-optic devices, which are conventionally less than 40 GHz. A possible solution is optical time-division multiplexing (OTDM) whereby multiple 40 Gb/s channels of the same wavelength are temporally interleaved to form the higher bit rate signal [1].

At the receiver, electronic detection and bit error rate measurement are enabled by demultiplexing the OTDM signal to its constituent sub-rate channels. Typically, this can be done by fast optical gating to extract each sub-rate channel pulse using either an electro-optic device such as an electro-absorption modulator [2-4], or all-optical schemes involving interaction in nonlinear medium with co-propagating synchronized pump pulse [5-7]. While the electro-absorption modulator is simple to implement, demultiplexing performance for standard devices is inferior at bit rates of 160 Gb/s due to inadequate switching time.

Recently, a new scheme for high performance demultiplexing a 160 Gb/s signal to 40 Gb/s (i.e. 4:1 demux) was demonstrated using an a $LiNbO_3$ phase modulator in conjunction with post-optical filtering [8]. It was shown that 40 GHz modulation of the 160 Gb/s signal manipulates the phase change over consecutive pulses in such a way to allow a 40 Gb/s channel to be discriminated by optical filtering. By similar principle, 2:1 demultplexing of 100 Gb/s signal has been shown using a phase modulator connected in a fiber loop [9], however in contrast to the filtering technique, this method requires cascading two modulators driven at different harmonic frequencies to enable equivalent 4:1 demultiplexing. Directly cascading $LiNbO_3$ amplitude modulators for demultiplexing has also been reported whereby the delay between modulators is adjusted so that the combined switching response produces a shorter gating window [10].

DISCLOSURE OF THE INVENTION

This invention is a high frequency optical processor, comprising a Mach-Zehnder amplitude modulator (MZM) embedded in a fibre mirror loop (together FL-MZM) in which the loop input and output are joined by a polarization maintaining coupler.

As a result of the configuration, the counterpropagating waves within the loop experience unequal amplitude modulation leading to output transmission of a high quality demultiplexed (DEMUXED) pulse train.

The processor is suitable for time-division demultiplexing data signals at bit rates of 80-160 Gb/s, and beyond, input to the loop. Bit-error rate measurements show high-performance 4:1 demultiplexing of a 160 Gb/s optical signal to 40 Gb/s channels.

Also, the nature of the fiber loop operation enables simultaneous channel add/drop functionality with recovery of the remaining tributary channels for further processing, all with a single device in contrast to other reported schemes.

Increasing the modulation frequency to will enable scaling of the technique to provide a robust, high performance extraction of higher frequency channels with add/drop functionality.

The processor is also suitable for carving high frequency pulse streams of low duty cycle from a continuous wave (unmodulated) laser applied at the input to the loop.

The MZM may have a modulation port to receive a modulating voltage, and a bias port to receive a bias voltage.

In further aspects the invention concerns methods for using the high frequency optical processor.

BRIEF DESCRIPTION OF THE DRAWINGS

An example of the invention will now be described with reference to the accompanying drawings, in which.

BEST MODES OF THE INVENTION

Figure 1:
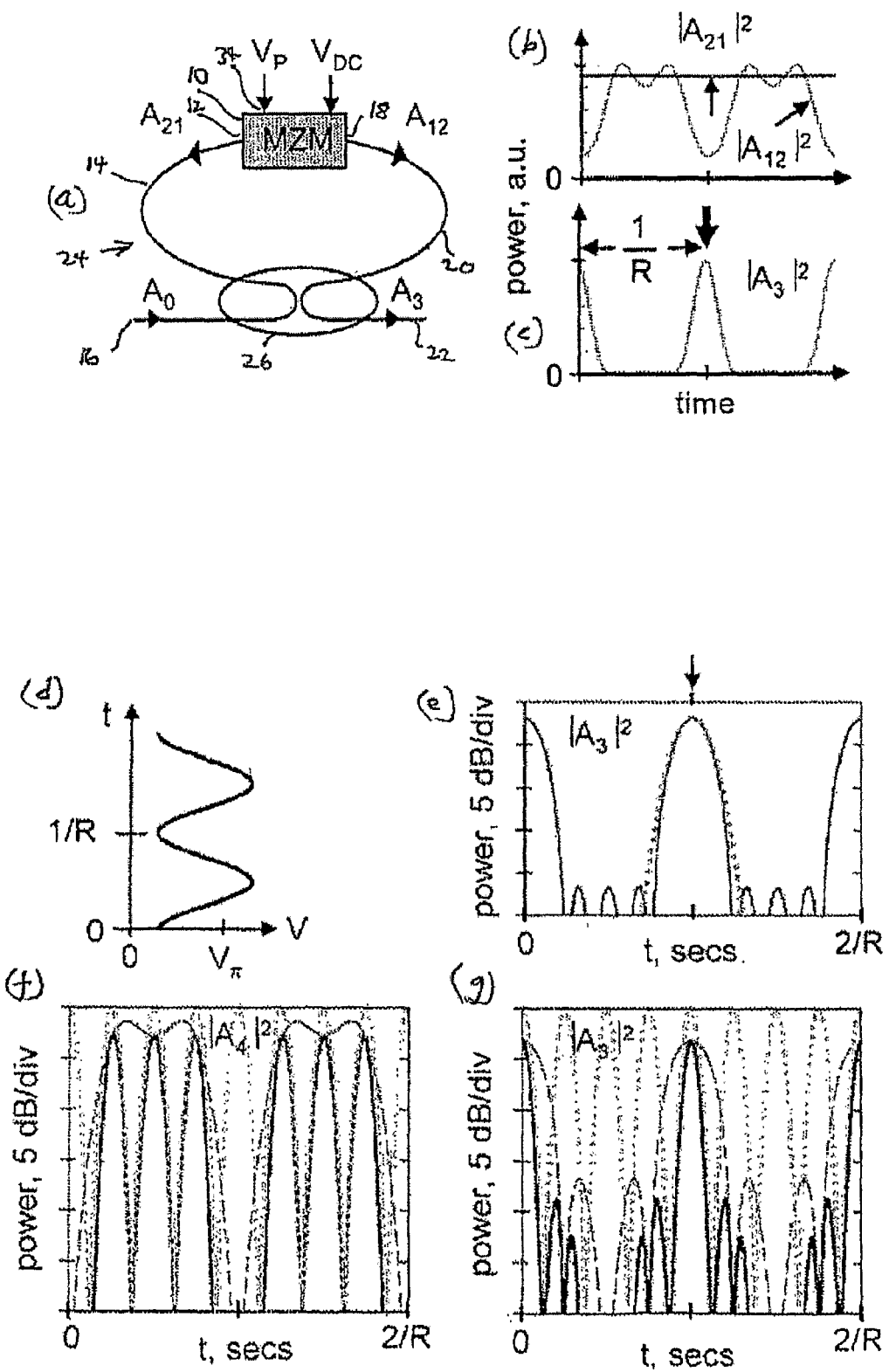
FIG. 1(a) is a schematic diagram of a Mach-Zehnder amplitude modulator (MZM) embedded in a fibre loop (FL-MZM) according to the invention.
FIG. 1(b) is a graph showing the calculated waveforms for $A_{12}$ and $A_{21}$ for input $A_0$ of constant amplitude when $V_{DC}=0.79\,V_\pi$ and $V_p=0.5\,V_\pi$ at modulation frequency, R.
FIG. 1(c) is a graph showing the calculated waveform for $A_3$ for input $A_0$ of constant amplitude when $V_{DC}=0.79\,V_\pi$ and $V_p=0.5\,V_\pi$ at modulation frequency, R.
FIG. 1(d) is a graph showing the numerical drive voltage V for $V_p=0.5\,V_\pi$ and $V_{DC}=0.79\,V_\pi$.
FIG. 1(e) is a graph showing the corresponding fiber-loop transmitted output, and (dotted) the Gaussian fit.
FIG. 1(f) is the numerical (solid curves) MZM fiber-loop reflected output for (dots) 160 GHz pulsed input compared to (dashes) output for CW optical input, in the case of R=40 GHz, $V_p=0.97\,V_\pi$, and $V_{DC}$–$0.5\,V_\pi$.
FIG. 1(g) is the numerical (solid curves) MZM fiber-loop transmitted output for (dots) 160 GHz pulsed input compared to (dashes) output for CW optical input, in the case of R=40 GHz, $V_p=0.97\,V_\pi$, and $V_{DC}$–$0.5\,V_\pi$.

Referring first to FIG. 1 the Mach-Zehnder amplitude modulator (MZM) embedded in a fibre loop (FL-MZM) [14] and its particular arrangement will now be described: The Mach-Zehnder amplitude modulator (MZM) 10 comprises input port 12 connected via optical fibre 14 to an optical input 16, and an output port 18 connected via optical fibre 20 to an optical output 22. The two lengths of optical fibre 14 and 20 are formed into a loop mirror 24 using a polarization maintaining (PM) coupler 26 with coupling ratio, ρ. An input signal of amplitude $A_0$ is split into two counter-propagating fields that circulate the fiber-loop in opposite directions and return to the coupler with different amplitudes (assuming co-polarized fields) of:

in the forward direction $$A_{12} = (T_{12} \cdot \rho)^{1/2} A_0$$

and in the reverse direction $$A_{21} = i(T_{21}[1-\rho])^{1/2} A_0$$

where $T_{12}$ and $T_{21}$ represent the MZM bi-directional optical power transmission functions for propagation from input port 12 to output port 18 and vice versa. Note the coupler induced π/2 phase shift for $A_{21}$.

The optical transmission of a MZM is a raised cosine function [13]. As a result in the forward direction, $T_{12}$ is given by:

$$T(V) = \alpha \cdot \sin^2(\pi \cdot V/2V_\pi),$$

where $V_\pi$ is the driving voltage for switching T from zero to its maximum, α the insertion loss factor (which is ignored by assuming α=1).

V is the applied voltage defined as $V(t) = V_P \cdot \cos(2\pi \cdot R \cdot t) + V_{DC}$, where $V_{DC}$, is the DC bias, and $V_p$ and R are the zero-to-peak amplitude and frequency of modulation respectively.

Since a high-speed MZM typically has a travelling wave design where velocity matches the applied voltage and optical fields in one direction, the effective $V_p$ for counter-propagating optical field (input to 18) is small [15] causing $T_{12}$ to be different from $T_{21}$. Measurements for the MZM confirm negligible backward modulation, i.e. $T_{21} \sim T(V_{DC})$.

The coupler transmitted output $A_3$ is given by the interference of $A_{12}$ and $A_{21}$ as:

$$A_3 = (\rho)^{1/2} A_{12} + i(1-\rho)^{1/2} A_{21} = [\rho(T_{12})^{1/2} - (1-\rho)(T_{21})^{1/2}] A_0. \quad (1)$$

Pulse Carving

It can be seen that $V_{DC}$ could be adjusted so that $T_{12}$ for $(V-V_{DC})<0$ confines $A_{12}$ around the peak of T with an average amplitude about equal to $A_{21}$. Also $(V-V_{DC})<0$, causes $A_{12}$ to form an inverted pulse, as a result a low duty cycle short pulse results for $A_3$.

In the case of constant $A_0$ input, $V_P = 0.5 V_\pi$, R=40 GHz, ρ=0.5 and an optimum $V_{DC}$ of 0.79 $V_\pi$. As shown in FIG. 1(*b*), $|A_{12}|^2$ forms an inverted pulse (of repetition, R) on a background of average $\sim|A_{21}|^2$. By equation (1) for $A_3$, the background is cancelled by $A_{21}$ and a nearly pedestal free pulse is emitted, as shown in FIG. 1(*c*).

The output pulse has a full width at half maximum (FWHM) of 5.4 ps and a peak power 19.7 dB above the peak pedestal; which is more favourable than the Gaussian (shown dotted). The throughput loss in peak power, G, is 12 dB.

Similar $A_3$ is obtained for other combinations of $V_P$ and $V_{DC}$; a higher $V_p = V_\pi$ with $V_{DC} = 0.59 V_\pi$ gives similar FWHM of 6.2 ps, with advantageously higher G of 3.1 dB.

Demultiplexing (DEMUX)

The principle of using the device for demultiplexing operation is the same as described above for pulse carving with the same modulation and biasing conditions for the MZM embedded in a fiber loop. The only difference is that the optical input is a pulsed signal instead of an unmodulated laser source.

Figure 2:
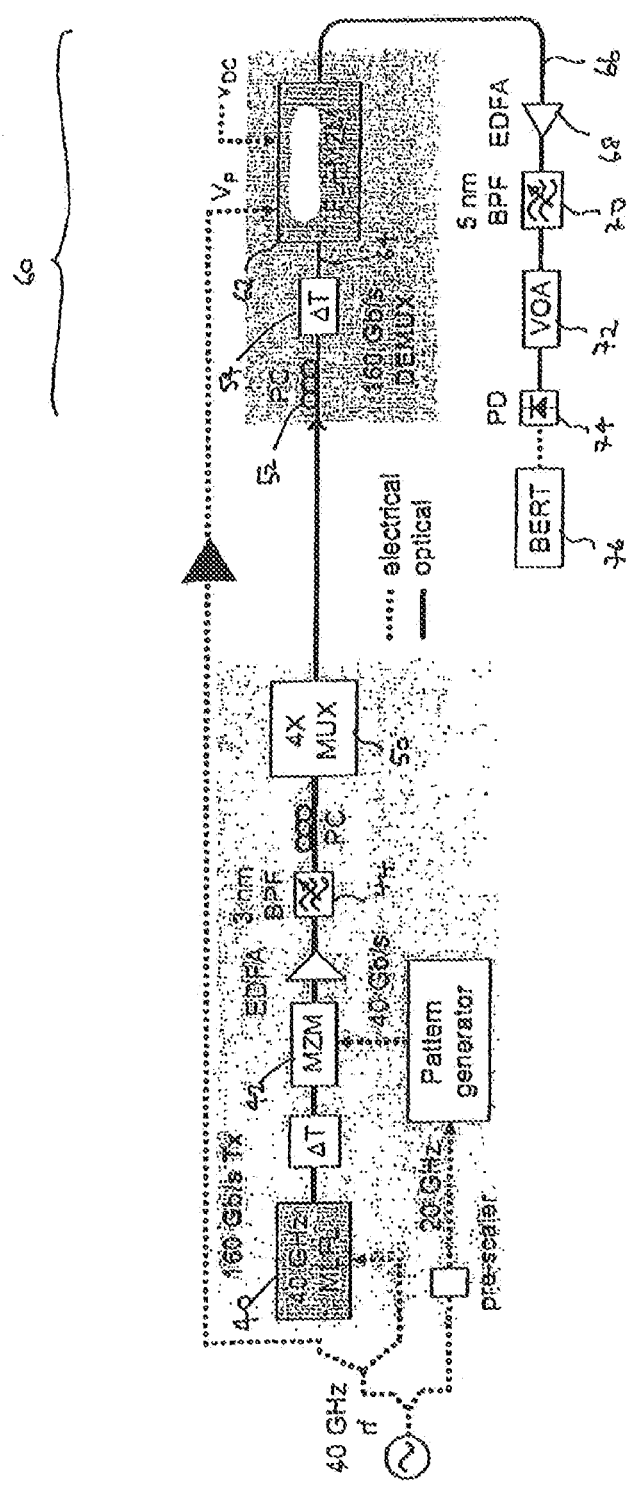
FIG. 2 is a schematic diagram showing the experimental set-up for demultiplexing (DEMUX) of a 160 Gb/s optical signal.
Figure 3:
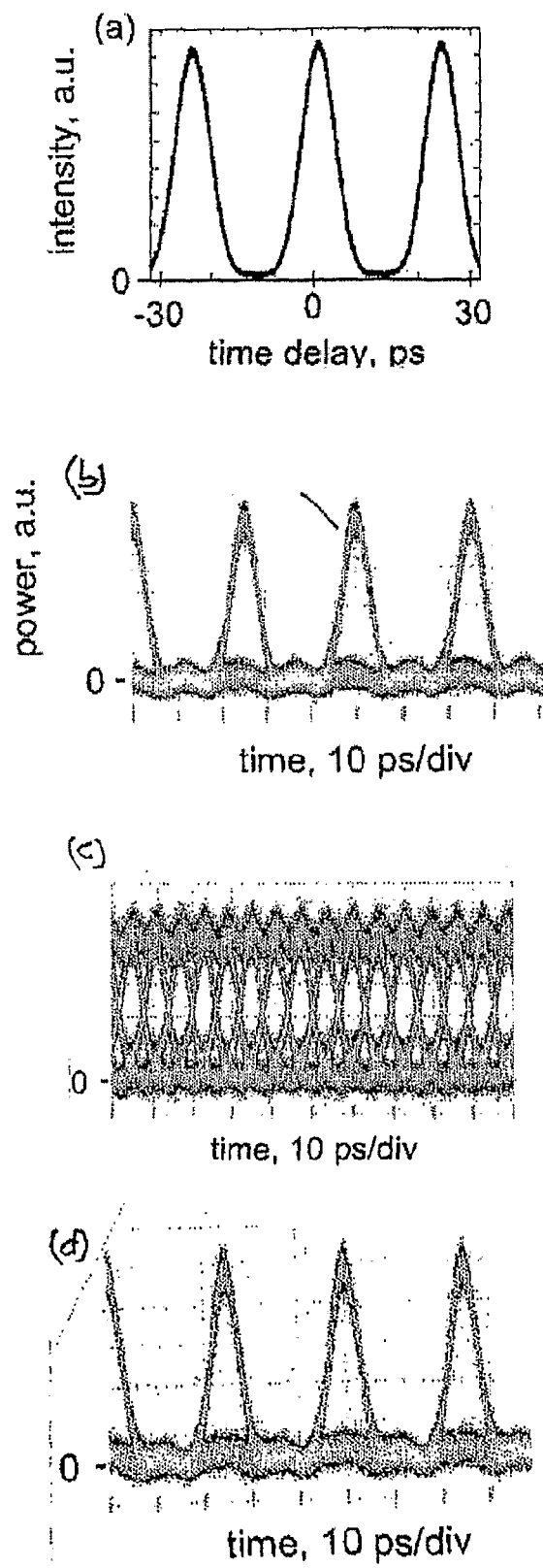
FIG. 3(a) is a graph showing the measured 40 GHz output pulse autocorrelation for CW laser input at 1550 nm wavelength to 40 GHz modulated FL-MZM with $V_p \sim V_\pi$.
FIG. 3(b) is a signal eye diagram at 1550 nm wavelength of a 40 Gb/s "back to back" (B2B) before multiplexing (MUX).
FIG. 3(c) is a signal eye diagram at 1550 nm wavelength of the 160 Gb/s after multiplexing (MUX) of the signal of FIG. 3(b).
FIG. 3(d) is a signal eye diagram at 1550 nm wavelength of the 40 Gb/s after demultiplexing (DEMUX) of the signal of FIG. 3(c) using a 40 GHz modulated FL-MZM.

In this example, referring to the setup of FIG. 2 and the graphs of FIG. 3, optical time division multiplexing (OTDM) is used to increase the data transmission rate per wavelength beyond the electro-optic bandwidth limits of optical signal transmitters and receivers. The system interleaves four 40 Gb/s channels modulated on the same wavelength to reach 160 Gb/s bit-rate [11], [12] and these are then going to be demultiplexed.

The 160 Gb/s return-to-zero (RZ) signal was generated from an active mode-locked fiber laser (MLFL) 40 emitting 40 GHz repetition-rate pulses of 2.4 nm bandwidth centered at 1550 nm wavelength. An external MZM 42 encoded data on the pulses at 40 Gb/s with a 231-1 pseudo-random bit pattern producing the signal eye diagram shown in FIG. 3(*b*). After amplification and filtering with a band-pass optical filter (BPF) of 3 nm bandwidth 44, a two-stage fiber interferometer circuit of 27-1 bit delay-length optically multiplexed (MUX) the signal to 160 Gb/s bit-rate 50. Its output pulse FWHM was 1.6 ps. FIG. 3(*c*) shows the 160 Gb/s eye diagram measured using a 65 GHz PD on an 80 GHz sampling scope.

The DEMUX setup includes a polarization controller (PC) 52 to optimize the launch polarization of the 160 Gb/s signal and an optical delay line (ΔT) 54 to align the pulse with respect to the modulator driving voltage, which was kept at the same amplitude as described above for the CW measurements.

In place of 40 GHz clock recovery from the 160 Gb/s signal, the drive voltage $V_p$ was derived from the transmitter. The output of the FL-MZM with $V_p \sim V_\pi$, produced the 40 Gb/s eye output shown in FIG. 3(*d*).

The FL-MZM used a commercial 40 Gb/s $LiNbO_3$ MZM 62 (X-cut, zero chirp, and single drive) device with insertion loss of 5.3 dB, and low frequency $V_\pi$ of 2.1 V. It was modulated by a 40 GHz sinusoid source amplified to ~24 dBm (10 V peak-to-peak) for $V_p \sim V_\pi$. The FL-MZM output was characterized for continuous wave (CW) input at 1550 nm wavelength. FIG. 3(*a*) shows the autocorrelation of the 40 GHz pulse train generated, whose de-convolved FWHM is 5.5 ps (22% duty-cycle) assuming Gaussian shape.

The bit-error rate (BER) performance was evaluated by connecting the DEMUX output 66 to an EDFA 68, followed by 5 nm BPF 70, variable optical attenuator (VOA) 72 and 40 Gb/s PD receiver 74 before the BER tester (BERT) 76.

Figure 4:
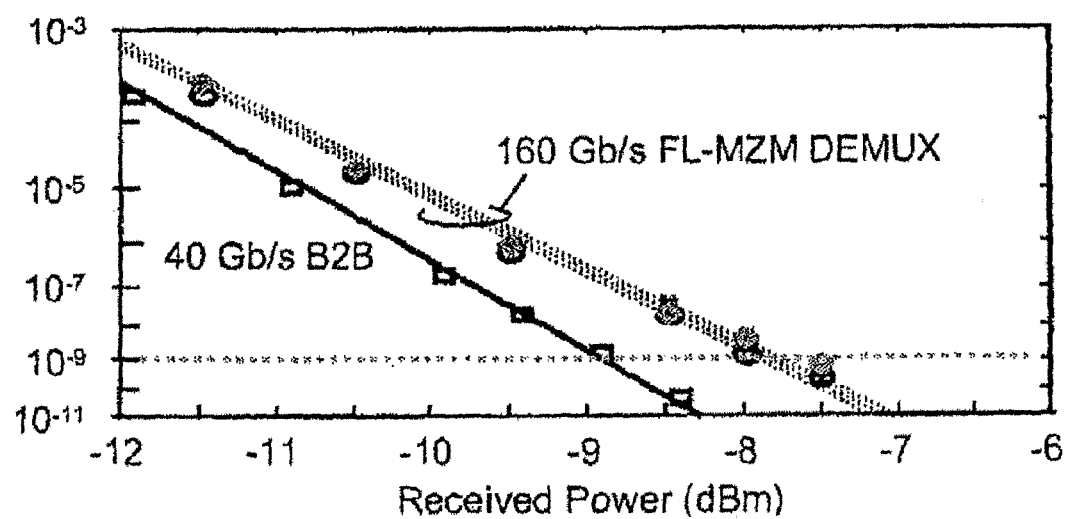
FIG. 4 is a graph showing BER performance for 160 GHz DEMUX of a 40 GB/s channel by a 40 GB/s modulated FL-MZM.

The BER curves in FIG. 4 are plotted as a function of received power to the PD and compared against the direct "back-to-back" (B2B) result obtained by connecting the 40 Gb/s signal from transmitter MZM directly to the VOA. For the FL-MZM, the 160 Gb/s DEMUX power penalty from 40 Gb/s B2B is ~1 dB for all four 40 Gb/s channels at BER of 10-9, thanks largely to the low loss and low duty-cycle gate obtained. The DEMUX scheme is not limited to conventional RZ signals, and would function equally for advanced formats such as RZ-DPSK. The FL-MZM has future potential to be fabricated with a MZM and additional coupler integrated on the same waveguide to improve device compactness.

In conclusion the invention is able to provide a simple, yet highly effective optical switch using a commercial 40 Gb/s LiNbO3 MZM connected in a fiber-loop demonstrated generation of a 5.3-5.9 ps optical gate at 40 GHz repetition tunable from 1535 to 1565 nm wavelength, enabling optical time-division DEMUX of a 160 Gb/s signal with a low bit-error rate power penalty <1 dB for all four 40 Gb/s channels.

REFERENCES

[1] R. S. Tucker, G. Eisenstein, and S. K. Korotky, "Optical time division multiplexing for very high bit-rate transmission," *IEEE Photon. Technol. Lett.*, vol. 6, pp. 1734-1749, 1988.

[2] A. H. Gnauck, G. Raybon, Member, IEEE, P. G. Bemasconi, J. Leuthold, Member, C. R. Doerr, and L. W. Stulzl "1-Tb/s (6 170.6 Gb/s) Transmission Over 2000-km NZDF Using OTDM and RZ-DPSK Format", *IEEE Photon. Technol. Lett.*, vol. 15, no. 11, pp. 1618-1620, 2003.

[3] H. Murai, M. Kagawa, H. Tsuji, and K. Fuji, "EA Modulator-Based Optical Multiplexing/Demultiplexing Techniques for 160 Gbit/s OTDM Signal Transmission", *IEICE Trans. Electron.*, vol. E88-C, no. 3, pp. 309-318, 2005.

[4] H.-F. Chou, J. E. Bowers, and D. J. Blumenthal, "Compact 160-Gb/s Add-Drop Multiplexer With a 40-Gb/s Base Rate Using Electroabsorption Modulators", *IEEE Photon. Technol. Lett.*, vol. 16, no. 6, pp. 1564-1566, 2004.

[5] C. Schubert, J. Berger, S. Diez, H. J. Ehrke, R. Ludwig, U. Feiste, C. Schmidt, H. G. Weber, G. Toptchiyski, S Randel, and K. Petermann, "Comparison of Interferometric All-Optical Switches for Demultiplexing Applications in High-Speed OTDM Systems", *IEEE J. Lightwave Technol.*, vol. 20, no. 4, pp. 618-624, 2002.

[6] R. Salem, A. S. Lenihan, G. M. Carter, and T. E. Murphy, "160-Gb/s Polarization-Independent Optical Demultiplexing in 2-m Nonlinear Fiber", *IEEE Photon. Technol. Lett.*, vo. 18, no. 21, pp. 2245-2247, 2006.

[7] H. Sotobayashi, C. Sawaguchi, Y. Koyamada, and W. Chujo, "Ultrafast walk-off-free nonlinear optical loop mirror by a simplified configuration for 320-Gbit/s time-division multiplexing signal demultiplexing," *Opt. Lett.* vol. 27, pp. 1555-1557, 2002.

[8] K. Igarashi, K. Katoh, and K. Kikuchi, "Optoelectronic time-division demultiplexing of 160-Gbit/s optical signal based on phase modulation and spectral filtering", *Optics Exp.*, vol. 15, no, 3, pp. 845-851, 2006.

[9] M. L. Dennis, W. I. Kaechele, W. K. Burns, T. F. Carruthers, and I. N. Duling, III, "Photonic Serial-Parallel Conversion of High-Speed OTDM Data", *IEEE Photon. Technol. Lett.*, vol. 12, no. 11, pp. 1561-1563, 2000.

[10] M. Jinno, "Ultrafast Time-Division Demultiplexer Based on Electrooptic On/Off Gates", *IEEE J. Lightwave Technol.*, vol. 10, no. 10, pp. 1458-1465, 1992.

[11] E. J. M. Verdurmen, Y. Zhao, E. Tangdiongga, J. P. Turkiewicz, G. D. Khoe, and H. de Waardt, "Error-free all-optical add-drop multiplexing using HNLF in a NOLM at 160 Gbit/s", Electron. Lett. 41, 349-350 (2005).

[12] Chou, J. E. Bowers, and D. J. Blumenthal, "Compact 160-Gb/s Add-Drop Multiplexer With a 40-Gb/s Base Rate Using Electroabsorption Modulators", IEEE Photon. Technol. Lett. 16, 1564-1566 (2004).

[13] M. Jinno, "Ultrafast Time-Division Demultiplexer Based on Electrooptic On/Off Gates", IEEE J. Lightwave Technol. 10, 1458-1465 (1992).

[14] M. L. Dennis, W. I. Kaechele, W. K. Burns, T. F. Carruthers, and I. N. Duling, III, "Photonic Serial-Parallel Conversion of High-Speed OTDM Data", IEEE Photon. Technol. Lett. 12, 1561-1563 (2000).

[15] G. K. Gopalaknshnan, W. K. Burns, R. W. McElhanon, C. H. Bulmer, and A. S. Greenblatt, "Performance and Modeling of Broadband LiNb03 Traveling Wave Optical Intensity Modulators", J. Lightwave Technol. 12, 1807-1819 (1994).

Although the invention has been described with reference to a particular example, it should be appreciated that it could be exemplified in many other forms and in combination with other features not mentioned above.

The invention claimed is:

1. A high frequency optical processor, comprising:
a single modulator embedded in a fiber mirror loop having a loop input and output joined by a polarization maintaining coupler, the single modulator being a Mach-Zehnder amplitude modulator (MZM) providing unequal amplitude counter-propagating lightwaves circulating the loop once before exiting at the output.

2. The processor according to claim 1, wherein the MZM has a modulation port to receive a modulating voltage, and a bias port to receive a bias voltage.

3. The processor according to claim 1, wherein the MZM is modulated with sinewave voltage and bias offset so that the optical output from the fiber-loop for continuous wave (unmodulated) optical input is a train of short pulses of low duty cycle.

4. The processor according to claim 3, wherein the optical output short pulses of low duty cycle have a repetition rate equal to the modulation frequency applied to the MZM.

5. The processor according to claim 1, wherein the MZM is modulated with sinewave voltage and bias offset so that the optical output transmitted from the fiber loop for optical signal input is a time-division demultiplexed signal at quarter the input signal bit-rate.

6. The processor according to claim 5, wherein the optical output has a bit rate at a quarter of the input signal bit-rate when the modulation frequency applied to the MZM is set to a quarter of the signal bit-rate.

7. The processor according to claim 1, wherein the MZM is modulated with sinewave voltage and bias offset so that the optical output reflected from the fiber-loop for optical data signal input is the input signal with a channel removed (dropped).

8. The processor according to claim 7, wherein the optical output is produced when the modulation frequency applied to the MZM is set to a quarter of the signal bit-rate.

9. A method for using the high frequency optical processor according to claim 1, comprising the steps of: modulating the MZM with sinewave voltage; and providing bias offset so that the optical output from the fiber-loop for continuous wave (unmodulated) optical input is a train of short pulses of low duty cycle.

10. A method for using the high frequency optical processor according to claim 1, comprising the steps of:
modulating the MZM with sinewave voltage; and
providing bias offset so that the optical output transmitted from the fiber loop for optical data signal input having a bit rate is a time-division demultiplexed signal at quarter the input signal bit-rate.

11. A method for using the high frequency optical processor according to claim 1, comprising the steps of:
modulating the MZM with sinewave voltage; and
providing bias offset so that the optical output reflected from the fiber-loop for optical data signal input is the input signal with a channel removed (dropped).

* * * * *